(12) United States Patent
Guo et al.

(10) Patent No.: US 12,449,376 B2
(45) Date of Patent: Oct. 21, 2025

(54) METHOD FOR EVALUATING SUBSTRATE SURFACE CLEANLINESS ORIENTED TO ADDITIVE FORGING

(71) Applicants: DALIAN UNIVERSITY OF TECHNOLOGY, Liaoning (CN); INSTITUTE OF METAL RESEARCH, CHINESE ACADEMY OF SCIENCES, Liaoning (CN)

(72) Inventors: Jiang Guo, Liaoning (CN); Renke Kang, Liaoning (CN); Zhaocheng Wei, Liaoning (CN); Yong Zhao, Liaoning (CN); Bin Xu, Liaoning (CN); Zhuji Jin, Liaoning (CN); Dianzhong Li, Liaoning (CN)

(73) Assignees: DALIAN UNIVERSITY OF TECHNOLOGY, Liaoning (CN); INSTITUTE OF METAL RESEARCH, CHINESE ACADEMY OF SCIENCES, Liaoning (CN)

( * ) Notice: Subject to any disclaimer, the term of this patent is extended or adjusted under 35 U.S.C. 154(b) by 210 days.

(21) Appl. No.: 18/247,461

(22) PCT Filed: Jan. 20, 2022

(86) PCT No.: PCT/CN2022/072970
§ 371 (c)(1),
(2) Date: Mar. 31, 2023

(87) PCT Pub. No.: WO2022/156744
PCT Pub. Date: Jul. 28, 2022

(65) Prior Publication Data
US 2024/0003824 A1    Jan. 4, 2024

(30) Foreign Application Priority Data

Jan. 22, 2021 (CN) .......................... 202110093916.6

(51) Int. Cl.
*G01N 21/94* (2006.01)

(52) U.S. Cl.
CPC ....... *G01N 21/94* (2013.01); *G01N 2021/945* (2013.01)

(58) Field of Classification Search
CPC .......................... G01N 21/94; G01N 2021/945
See application file for complete search history.

(56) References Cited

U.S. PATENT DOCUMENTS

| | | | | |
|---|---|---|---|---|
| 3,618,374 A | * | 11/1971 | Miller | G01N 13/02 73/104 |
| 4,560,874 A | * | 12/1985 | Cinzori | G01J 5/0896 250/342 |

(Continued)

FOREIGN PATENT DOCUMENTS

| | | |
|---|---|---|
| CN | 201946574 U | 8/2011 |
| CN | 203011806 U | 6/2013 |

(Continued)

*Primary Examiner* — Blake C Riddick
(74) *Attorney, Agent, or Firm* — NKL LAW; Allen Xue

(57) ABSTRACT

A method for evaluating a surface cleanliness oriented toward additive forging of a metal substrate employs weight coefficients corresponding to oil contaminants, particles and chips. Contamination scores of different contaminants are determined separately by different methods, and a surface cleanliness thereof is characterized in a quantitative manner by calculating the sum of the product of the weight coefficient and the contamination score of each contaminant. Further, an accurate and systematic method for evaluating a surface cleanliness employs weight coefficient of each contaminant determined based on a degree of adverse influence of the contaminant on the interface bonding of a substrate. Different detection methods are used for different contaminants. The contamination score of each contaminant is determined by the sum of the product of the weight coefficient and the contamination score of the corresponding (Continued)

contaminant, the comparison relationship is thus established, a cleanliness level is finally determined.

1 Claim, 1 Drawing Sheet

(56) References Cited

U.S. PATENT DOCUMENTS

| | | | | |
|---|---|---|---|---|
| 5,062,707 | A * | 11/1991 | Adler-Golden | G01N 21/62 356/311 |
| 5,275,667 | A * | 1/1994 | Ganesan | H01L 21/02046 134/1 |
| 5,528,648 | A * | 6/1996 | Komatsu | G01N 23/223 378/45 |
| 5,870,186 | A * | 2/1999 | Mogan | G01N 21/94 250/573 |
| 5,882,938 | A * | 3/1999 | Takahashi | G01N 13/02 422/62 |
| 6,370,947 | B1 | 4/2002 | Casati et al. | |
| 6,545,272 | B1 * | 4/2003 | Kondo | G01N 23/225 378/34 |
| 6,867,854 | B1 * | 3/2005 | Wapner | G01N 13/02 73/64.48 |
| 2002/0135760 | A1 * | 9/2002 | Poole | G01N 21/31 356/300 |
| 2003/0235926 | A1 * | 12/2003 | Knollenberg | G01N 29/022 436/178 |
| 2006/0169032 | A1 * | 8/2006 | Sutton | G01N 13/02 73/64.52 |
| 2008/0121027 | A1 * | 5/2008 | Hanson | G01N 1/40 73/61.72 |
| 2009/0229353 | A1 * | 9/2009 | Moltran | G01N 21/94 73/61.71 |
| 2012/0182538 | A1 * | 7/2012 | Koole | G03F 1/84 355/75 |
| 2015/0362417 | A1 * | 12/2015 | Haberland | G01N 13/02 356/154 |
| 2017/0122871 | A1 * | 5/2017 | Meer | G01N 21/6456 |
| 2017/0228882 | A1 * | 8/2017 | Dillingham | G06T 7/60 |
| 2017/0328878 | A1 | 11/2017 | Xi et al. | |
| 2019/0107490 | A1 * | 4/2019 | Schindler | G01N 21/6428 |
| 2019/0316736 | A1 * | 10/2019 | Jacksier | F17C 13/02 |
| 2020/0386697 | A1 * | 12/2020 | Yamagami | G01N 23/2204 |
| 2021/0016744 | A1 * | 1/2021 | Philipp | G01N 21/94 |
| 2023/0288353 | A1 * | 9/2023 | Kikuta | G01N 23/223 |

FOREIGN PATENT DOCUMENTS

| | | |
|---|---|---|
| CN | 105241779 A | 1/2016 |
| CN | 105891433 A | 8/2016 |
| CN | 110782144 A | 2/2020 |
| CN | 111366502 A | 7/2020 |
| CN | 112010444 A | 12/2020 |
| CN | 112903709 A | 6/2021 |
| JP | 2003329623 A | 11/2003 |

* cited by examiner

METHOD FOR EVALUATING SUBSTRATE SURFACE CLEANLINESS ORIENTED TO ADDITIVE FORGING

TECHNICAL FIELD

The present invention belongs to the field of surface engineering, and particularly relates to a method for evaluating a substrate surface cleanliness oriented to additive forging of a metal substrate.

BACKGROUND ART

Large forgings are core components of major equipment. Currently, large forgings are mainly used for support ring of nuclear power plant, cylinder of nuclear power pressure vessel, large-diameter pressure pipe, etc. The metal substrate additive forging technology is a revolutionary technology proposed by Institute of Metal Research, Chinese Academy of Sciences, which avoids the metallurgical defects caused by the size effect of large ingot in the preparation process of large forgings from large cast ingots. The metal substrate additive forging technology takes a small-sized homogenized casting blank as a unit, a large ultra-thick scale homogenized forging blank is then obtained after the unit is subjected to such processes as surface processing, surface cleaning, vacuum packaging, and high-temperature deformation, then a large homogenized high-quality forging is finally manufactured after subsequent forging and heat treatment. In the process of metal substrate additive forging, the substrate surface cleaning is a foundation of substrate additive forging, which affects the bonding effect among substrates during the additive forging. Good cleaning effect can further improve the bonding performance of the substrate and guarantee the bonding effect. Therefore, it is very important to evaluate the cleaning effect on the substrate surface, that is, the surface cleanliness.

After the substrate is machined, contaminants on a surface of the substrate include mainly oil contaminants, particles and chips, which greatly hinder the interface bonding of the substrate. Therefore, the above contaminants need to be cleaned off, and the surface cleanliness of the substrate needs to be evaluated after cleaning. In terms of evaluating the surface cleanliness of a substrate in additive forging process of metal substrate, no scientific evaluation system is available at present. In practical engineering applications, SITA CleanoSpector is generally used for detecting the surface cleanliness of a substrate, which uses a relative fluorescence unit (RFU) to evaluate the surface cleanliness. Specifically, SITA CleanoSpector detects contaminants on a metal surface by emitting the optimal wavelength light through a UV light source, and reflects the cleanliness of the measured area through the induced fluorescence intensity. This detection and evaluation method is relatively simple and only sensitive to oil contaminant, so it is difficult to detect the contamination of particles and chips, resulting in poor evaluation of a substrate surface cleanliness.

In other fields, there are also some detection and evaluation systems for surface cleanliness. The Chinese Patent CN201020622794.2 discloses a device for detecting the surface cleanliness of a wafer, which uses a correlation sensor to detect contamination particles on a wafer surface, so as to evaluate the cleanliness of the wafer surface. The contaminant detection and evaluation method focuses on surface particle contamination, and is incapable of detecting particle contamination with too small particle size, let alone identifying oil contaminants on a surface. The Chinese Patent CN201220686444.1 discloses a cleanliness detection device, which uses a particle counter to evaluate the surface cleanliness of a detected object according to the number of particles sucked. The evaluation system also only focuses on particulate contaminants. The Chinese Patent CN201510730678.X provides a method for detecting the cleanliness of a mechanical surface, which takes advantage of good solubility of organic matter in AK225 solution to sample surface contaminants, then separates the contaminants after vacuum drying, obtains the content of contaminants per unit area by a weighing method, and finally determines the surface cleanliness with reference to the standards. The method is suitable for detecting the organic contaminants, but it is difficult to detect the solid particle contaminants which are tightly adsorbed on the surface and insoluble in solution. In addition, there is a method to evaluate the surface cleanliness based on the principle that particle contaminants change the laser light path. The above methods play a good role in their respective applicable fields, but the above evaluation systems are unsuitable for a substrate surface for additive forging where a plurality of contaminants coexist.

SUMMARY

In order to solve the above problems in the prior art, the present invention provides a high-accuracy method for evaluating a substrate surface cleanliness a metal substrate for additive forging, which is suitable for the additive forging of the metal substrate.

In order to achieve the above objective, the present invention follows basic idea as follows: with respect to the evaluation of surface cleanliness, first of all, a type of contamination on a substrate surface should be identified, and a corresponding weight coefficient is determined according to a degree influence of the type of contaminants on the interface bonding performance of additive forging; a water drop contact angle method is then used to detect the oil contaminant, an optical observation method is used to detect particulate contaminants and chip contaminants, which are distinguished according to their respective characteristics, and a contamination score is given according to a degree of contamination after measurement; a sum of products of weight coefficients of various contaminants and the contamination score is calculated, and a surface cleanliness level is obtained according to the sum of products.

In order to realize the evaluation of a substrate surface cleanliness of a metal substrate for additive-forged, the present invention includes the following technical solution:

A method for evaluating a surface cleanliness of a metal substrate for additive forging, including the following steps:

Step 1, determining types of contaminants on the surface

A variety of contaminants will remain on a surface of a substrate for additive forging after milling. Therefore, same milling parameters are used to machine a small sample, a part of the surface of the small sample is detected with an X-ray energy spectrum analyzer in a surface scanning mode, different areas are selected for multiple measurements, and then types of surface contaminants are determined according to the compositions and appearance characteristics by combining the observation through an ultra-depth-of-field microscope.

The above detection identifies that the surface contaminants of a substrate for additive forging after milling contain oil contaminants, particles and chips.

Step 2. determining weight coefficients of different contaminants

Based on the interface bonding performance of a substrate for additive forging, a hindrance degrees of oil contaminants, particles and chips on the interface bonding of the substrate are determined, and a weight coefficient $WC_i$ corresponding to a contaminant according to obstruction degree on the interface bonding of the substrate is determined, where weight coefficients of oil contaminants, particles and chips are expressed as $WC_1$, $WC_2$ and $WC_3$, respectively.

The above weight coefficients refer to the degrees of influence of different contaminants on the interface bonding, the greater the impact is, the greater the corresponding weight coefficient becomes, otherwise, the smaller the weight coefficient becomes. The sum of the weight coefficients of oil contaminants, particles and chips is 1, that is, $WC_1+WC_2+WC_3=1$. In a test of the hindrance degrees of oil contaminants, particles and chips on the interface bonding of the substrate, oil contaminants, particles and chips are artificially added on a clean substrate respectively, so as to accordingly determine the corresponding weight coefficients. According to the test, the value of $WC_1$ is set between 0.5 and 0.7, the value of $WC_2$ is set between 0.2 and 0.4, and the value of $WC_3$ is set between 0.0 and 0.2.

Step 3, determining contamination scores of different contaminants

A measurement area is randomly selected on the surface of the substrate, contamination scores $g_i$ are determined respectively, where i=1, 2 or 3; a water droplet contact angle method is adopted to determine a contamination score of oil contaminants, recorded as $g_1$; and an optical observation method is adopted to determine contamination scores $g_2$ and $g_3$ corresponding to particulate contaminants and chip contaminants, respectively.

Steps of the water droplet contact angle method for determining the contamination score $g_i$ of oil contaminants are as follows: comparing the left and right average values of the water droplet contact angle with the reference value to determine whether a point is a contamination point; performing total 10 water droplet contact tests in different sampling areas, and obtaining the contamination score $g_1$ of oil contaminants from the ratio of the number of contamination points to that of total measurement points.

Steps for determining the contamination score $g_2$ of particulate contaminants are as follows: determining the number of particulate contaminants through the optical observation method, and obtaining the contamination score $g_2$ of particulate contaminants by taking the amount of particulate contaminants divided by 10.

Steps for determining the contamination score $g_3$ of chip contaminants are same as those for the particulate contaminants.

Step 4, determining a cleanliness level

A cleanliness level C is selected according to the contamination score L, where the contamination score L is determined by the sum of products of the weight coefficient and the contamination score of each contaminant, with the calculation method being as follows:

$$L = \sum_{i=1}^{i=3} WC_i \times g_i \quad (1)$$

where the comparison relationship between the cleanliness level C and the contamination score L is as follows:

Level I indicates an ideal clean state, and L=0;
Level II indicates a clean state, and $0<L\leq0.25$;
Level III indicates a general clean state, and $0.25<L\leq0.50$;
Level IV indicates a state of slight contamination, and $0.50<L\leq0.75$;
Level V indicates a state of contamination, and $0.75<L\leq1.00$;

In Levels I to V, values of $g_1$, $g_2$ and $g_3$ shall not be greater than 1, otherwise they shall be directly classified as Level VI.

Compared with the prior art, the present invention has the beneficial effects as follows:

1. In the present invention, weight coefficients corresponding to oil contaminants, particles and chips are determined according to the test results, contamination scores of different contaminants are determined separately by different methods, and a surface cleanliness thereof is characterized in a quantitative manner by calculating the sum of products of the weight coefficient and the contamination score.

2. The present invention provides an accurate and systematic method for evaluating a surface cleanliness a metal substrate for additive forging. A weight coefficient of each contaminant is determined based on a degree of adverse influence of the contaminant on the interface bonding of a substrate; different detection methods are used for different contaminants, and contamination scores of different contaminants are determined; the contamination score of each contaminant is determined by the sum of products of the weight coefficient and the contamination score of the corresponding contaminant, the comparison relationship is thus established, a cleanliness level is finally determined, and the surface cleanliness of the substrate is thus evaluated in an accurate and quantitative manner.

DETAILED DESCRIPTION OF THE EMBODIMENTS

Figure 1:
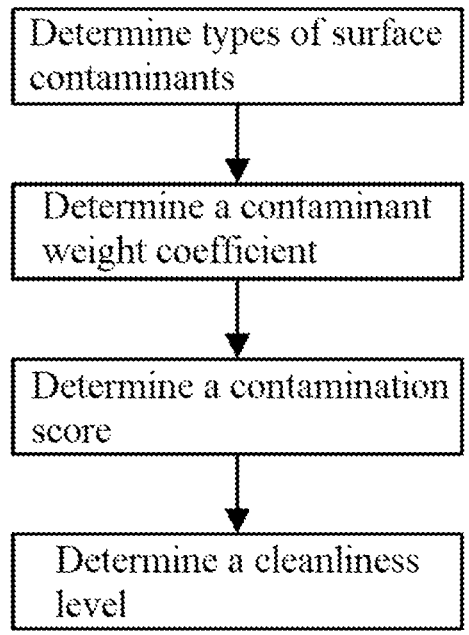
FIG. 1 is a flowchart of a method for evaluating a surface cleanliness.
Figure 2:
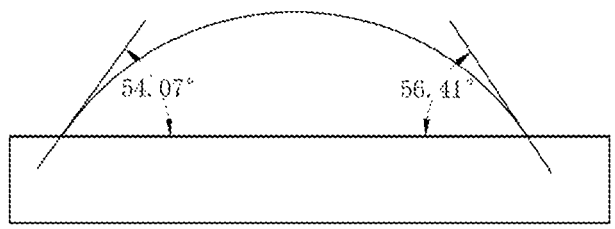
FIG. 2 is a schematic diagram of detection by a water droplet contact angle method at a point of oil contaminant.
Figure 3:
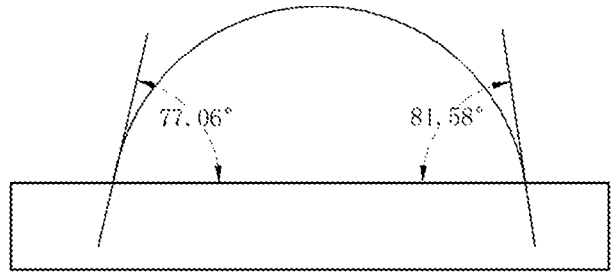
FIG. 3 is a schematic diagram of detection by a water droplet contact angle method of a point free of oil contaminant.

In order to demonstrate the process of evaluating a substrate surface cleanliness suitable for additive forging, the present invention will be further described according to FIGS. 1-3.

Embodiment 1 of evaluating a substrate surface cleanliness of a metal substrate for additive forging:

Steps for evaluating a surface cleanliness of a small sample after milling and simply purging with an air gun are as follows:

1) Different areas are selected to detect a part of a surface of the small sample with an X-ray energy spectrum analyzer in a surface scanning mode, and types of surface contaminants are then determined as oil contaminants, particles and chips according to the composition and appearance characteristics by combining the observation through an ultra-depth-of-field microscope.

2) The degree of hinderance of oil contaminants, particles and chips to the interface bonding of the substrate is determined based on the interface bonding performance of a metal substrate for additive forging, and a weight coefficient $WC_i$ corresponding to a contaminant is determined according to hindrance degree to the interface bonding of the substrate, where weight coefficients of oil contaminants, particles and chips are expressed as $WC_1$, $WC_2$ and $WC_3$, respectively. In the present embodiment, values of $WC_1$, $WC_2$ and $WC_3$ are set to be 0.6, 0.3 and 0.1, respectively.

3) A measurement area is selected on the surface of the substrate, contamination scores $g_i$ are determined respectively by using the corresponding detection methods. A water droplet contact angle method is used to determine a contamination score $g_i$ of oil contaminants. In the present embodiment, the oil contaminants are hydrophilic oil contaminants. A reference value is set to be 75° according to the test, that is, a water droplet with an average contact angle on left and right sides being less than 75° is regarded as a point where an oil contaminant exist, while a water droplet with an average contact angle on left and right sides being greater than 75° is regarded as a clean point. Schematic diagrams of detecting an oil contaminant and distinguishing whether it is an oil contaminant point of are shown in FIGS. 2 and 3. An optical observation method is used to determine contamination scores $g_2$ and $g_3$ corresponding to particulate contaminants and chip contaminants, respectively. In the present embodiment, $g_1$ is 0.4, $g_2$ is 0.9, and $g_3$ is 0.7 according to the test.

4) A contamination score is calculated, a cleanliness level is determined and the surface cleanliness is then evaluated. The contamination score L calculated by equation (1) is 0.58, and a comparison of the cleanliness level C with the contamination score L indicates that the cleanliness level C is IV, being a state of slight contamination.

Embodiment 2 of evaluating a substrate surface cleanliness oriented to metal additive forging:

Steps for evaluating a surface cleanliness of a small sample after milling and purging with an air gun and an ultrasonic cleaning for 15 min are as follows:

1) Different areas are selected to detect a part of a surface of the small sample with an X-ray energy spectrum analyzer in a surface scanning mode, and only one type of surface contaminant, namely, particulate contaminants, is identified according to the composition and appearance characteristics by combining the observation through an ultra-depth-of-field microscope.

2) The degree of hinderance of oil contaminants, particles and chips to the interface bonding of the substrate is determined based on the interface bonding performance of a metal substrate for additive forging, and a weight coefficient $WC_i$ corresponding to a contaminant is determined according to hindrance degree to the interface bonding of the substrate, where weight coefficients of oil contaminants, particles and chips are expressed as $WC_1$, $WC_2$ and $WC_3$, respectively. In the present embodiment, values of $WC_1$, $WC_2$ and $WC_3$ are set to be 0.6, 0.3 and 0.1, respectively.

3) A measurement area is selected on the surface of the substrate, contamination scores $g_i$ are determined respectively by using the corresponding detection methods. In the present embodiment, as only particulate contaminants are identified after cleaning, an optical observation method is used to only determine the contamination score $g_2$ corresponding to the particulate contaminants. In the present embodiment, $g_2$ is 0.4 according to the test.

4) A contamination score is calculated, a cleanliness level is determined and the surface cleanliness is then evaluated. The contamination score L calculated by equation (1) is 0.12, and a comparison of the cleanliness level C with the contamination score L indicates that the cleanliness level C is II, being a clean state.

The present invention is not limited to the present embodiment, and any equivalent ideas or modifications within the technical scope of the present invention should be included in the protection scope of the present invention.

We claim:

1. A method for evaluating surface cleanliness of metal substrate for additive forging, comprising the following steps:

step 1: determining contaminants on surface of the metal substrate, which comprises:

machining a sample smaller than the metal substrate using same milling parameters used in machining the metal substrate, examining a plurality of surface areas of the sample using an X-ray energy spectrum analyzer in a surface scanning mode and an ultra-depth-of-field microscope, and then determining types of surface contaminants according to the compositions and appearance characteristics obtained by the X-ray energy spectrum analyzer and by the ultra-depth-of-field microscope, wherein the contaminants include oil contaminants, particles, and chips;

step 2: determining weight coefficients of the contaminants, which comprises:

assigning weight coefficients of oil contaminants, particles and chips are expressed as $WC_1$, $WC_2$ and $WC_3$, respectively, and wherein $WC_1+WC_2+WC_3=1$, wherein a weight coefficient corresponds to a degree of hindrance on interface bonding of the substrate, wherein $WC_1$ is between 0.5 and 0.7, $WC_2$ is between 0.2 and 0.4, and of $WC_3$ is between 0.0 and 0.2;

step 3: determining a contamination score of each contaminate, selecting a measurement area on the surface of the metal substrate, determining the contamination score of oil contaminant $g_1$, using a water droplet contact angle method; and determining the contamination score of particles $g_2$ and the contamination score of chips $g_3$ using an optical observation method;

wherein, the water droplet contact angle method comprises: comparing an average value of left contact angle and an average value of right contact angle of the water droplet with a reference value to determine a contamination point; performing 10 water droplet contact tests in total in 10 different areas on the surface of the metal substrate, and obtaining the contamination score $g_1$ that equals to a ratio of the number of contamination points to the number of total measurement points;

the optical observation method comprises: determining a number of particles and a number of chips using the optical observation method, respectively, and obtaining the contamination score $g_2$ and the contamination score $g_3$ by dividing the number of particles and the number of chips by 10, respectively; and step 4: determining a cleanliness level, which comprises:

selecting a cleanliness level according to the contamination score L, wherein the contamination score L is determined by $$L = \sum_{i=1}^{i=3} WC_i \times g_i \qquad (1)$$

wherein

Cleanliness Level I indicates an ideal clean state, and L=0;

Cleanliness Level II indicates a clean state, and $0 < L \leq 0.25$;

Cleanliness Level III indicates a general clean state, and $0.25 < L \leq 0.50$;

Cleanliness Level IV indicates a state of slight contamination, and $0.50 < L \leq 0.75$;

Cleanliness Level V indicates a state of contamination, and $0.75 < L \leq 1.00$; and Cleanliness Level VI indicates a state of heavy contamination, and $L > 1.00$.

* * * * *